United States Patent [19]

Vadjunec

[11] Patent Number: 4,685,693

[45] Date of Patent: Aug. 11, 1987

[54] UPRIGHT WHEELCHAIR

[76] Inventor: Carl F. Vadjunec, 130 N. Portland, Youngstown, Ohio 44509

[21] Appl. No.: 908,010

[22] Filed: Sep. 16, 1986

[51] Int. Cl.[4] ........................ A47C 13/00; B62D 51/00

[52] U.S. Cl. ........................ 280/242 WC; 297/DIG. 4; 5/61

[58] Field of Search ............... 280/242 WC, 249, 648; 297/DIG. 4; 180/74; 5/431

[56] References Cited

U.S. PATENT DOCUMENTS 2,847,058 8/1949 Lee ..................................... 280/249

4,390,076 6/1983 Wier et al. .................. 280/242 WC 4,453,732 6/1984 Assanah et al. ............. 280/242 WC

*Primary Examiner*—John J. Love

*Assistant Examiner*—Donn McGiehan

*Attorney, Agent, or Firm*—Harpman & Harpman

[57] ABSTRACT

An upright wheelchair that allows the user to be in an upright standing position in the chair and self-propel the chair from that position by use of auxiliary drive wheels inner-connected with the main wheels. An enlarged chair back provides vertical support for the user and is pivoted for horizontal positioning with a fold-out support.

5 Claims, 5 Drawing Figures

UPRIGHT WHEELCHAIR

BACKGROUND OF THE INVENTION

1. Technical Field

This invention relates to upright wheelchairs that are used to move handicapped or injured persons. The wheelchairs are chair configurations with two large drive wheels and usually a pair of secondary multi-directional support wheels.

2. Description of Prior Art

Prior Art devices of this type have relied on a variety of different designs for hand driven actuation of the main drive wheels through a variety of structures.

In U.S. Pat. No. 4,274,650 a wheelchair is disclosed having a hand drive assembly consisting of a multiple gear configuration connecting the main drive axle via an intermediate gear to a hand drive gear. The drive assembly is used on a standard wheelchair configuration so that the user can propel the chair forward by rotation of cranks associated with the drive mechanism.

In U.S. Pat. No. 4,506,901 shows a hand-propelled chariot having a seat configuration with a chain drive with inner-connected gears on the drive axle and a hand crank. The user sits in the chair and cranks the handle driving the chair and inner-connected drive axle moving the chair forward. Each drive axle wheel is independently actuated for maximum maneuverability.

U.S. Pat. No. 3,249,368 discloses a device that supports the uses in an upright i.e. standing position on a multiple wheeled frame. The user has a pair of poles that he or she uses to push himself and the attached wheeled frame forward.

SUMMARY OF THE INVENTION

A upright wheelchair device to a support a user in a standing position on a maneuverable wheeled frame. The device can be operated by a user-accessible drive wheel inter-connected to the usual oversize main drive wheels on a normal wheelchair. The user is supported by an upright back body support which can be pivoted from a vertical position to a horizontal position and supported by an extensible support structure.

DESCRIPTION OF THE PREFERRED EMBODIMENT

Figure 1:
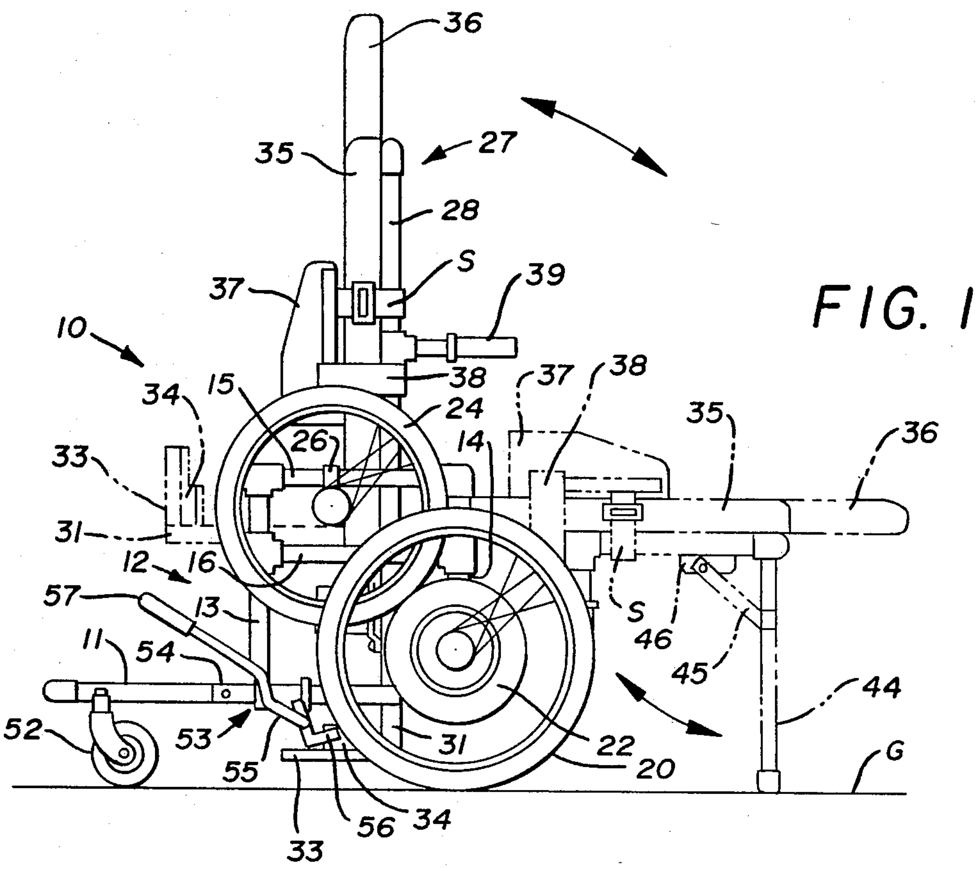
FIG. 1 is a side plan view of the upright wheelchair with a portion shown in horizontal position in broken lines.
Figure 2:
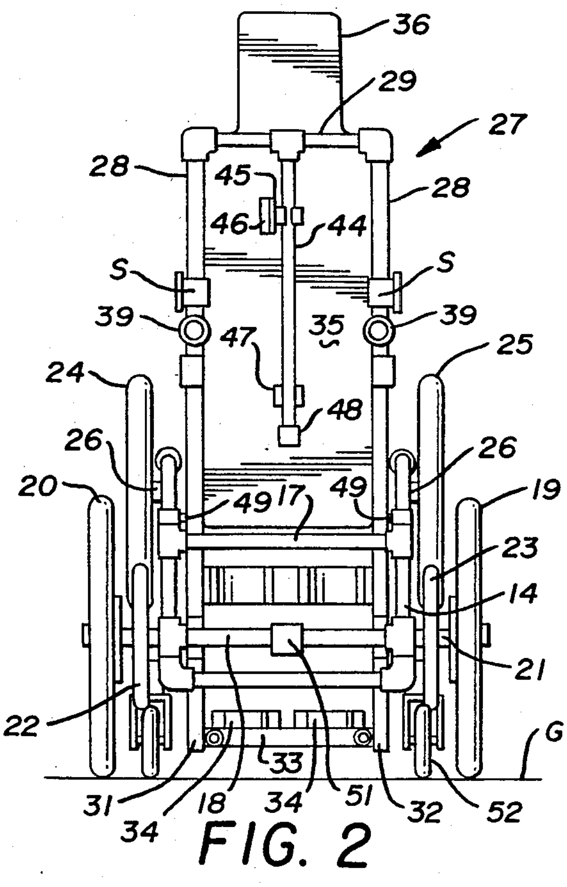
FIG. 2 is an end view of the upright wheelchair on lines 2—2 of FIG. 1.
Figure 3:
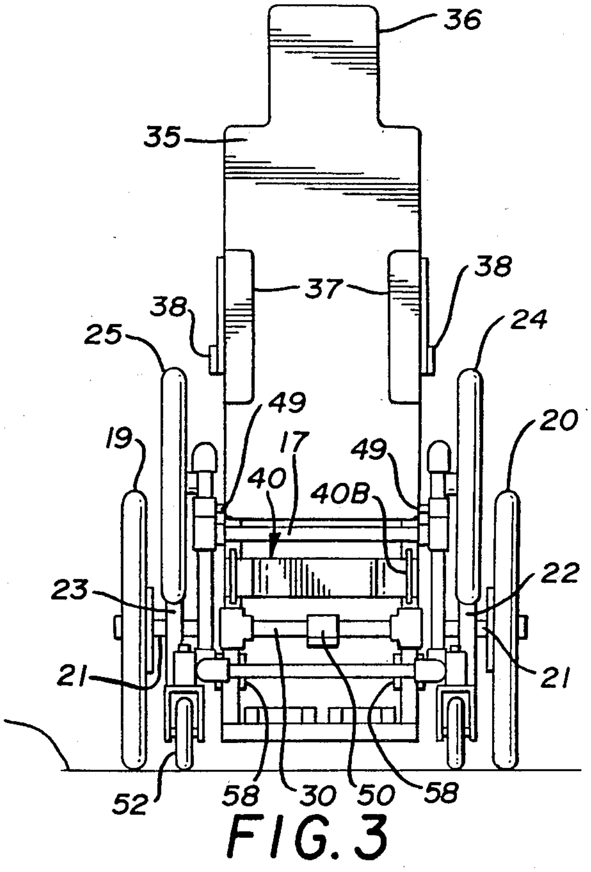
FIG. 3 is an opposite end view of the upright wheelchair on lines 3—3 of FIG. 1.
Figure 4:
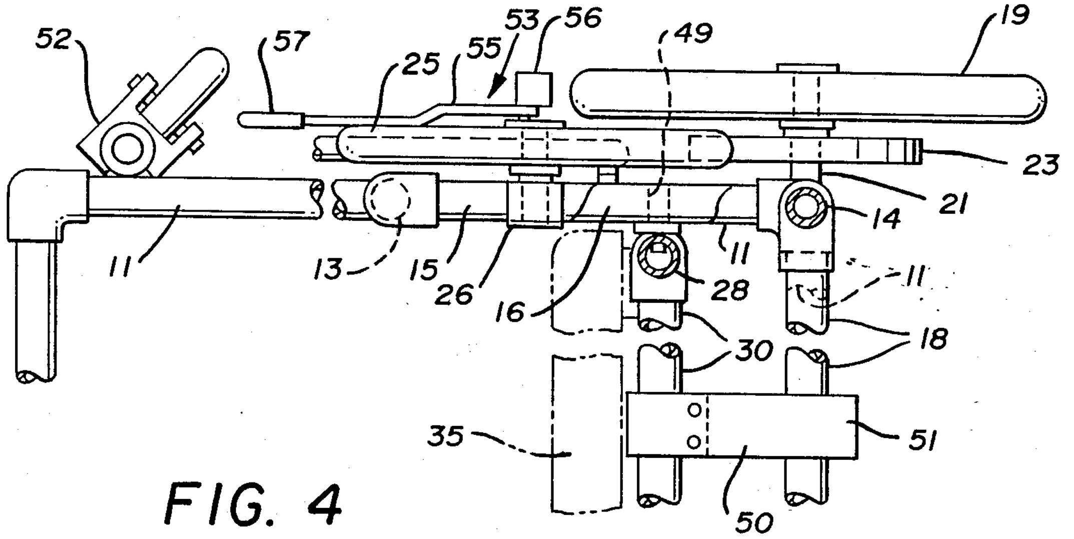
FIG. 4 is a top plan view of a portion of the drive wheel configuration with portions broken away.

Referring to FIGS. 1,2 and 3 of the drawings an upright wheelchair can be seen having a main support frame 10 with a rectangular base 11. A pair of oppositely disposed upstanding side frame configurations 12 are each comprised of spaced vertical support members 13, and 14 and spaced horizontal support members 15 and 16 inner-connecting said vertical support members 13 and 14. Transversely extending side frame connection members 17 and 18 are positioned between said vertical members 13 and 14 as best seen in FIG. 2 of the drawings. A pair of oppositely disposed main support wheels 19 and 20 are each rotatably fastened to an axle 21 extending from said vertical support member 14. Each of the main support wheels 19 and 20 are of a spoked hub configuration as is well known in the wheel chair art. A pair of inner drive wheels 22 and 23 are positioned respectively on the axles 21 adjacent said main support wheels between same and the upstanding side frame configurations 12. The inner drive wheels 22 and 23 are secured to said main support wheels 19 and 20 for rotation of the same.

A secondary pair of drive wheels 24 and 25 are each rotatably secured to a respective axle and support bracket assembly 26 secured to and extending below the horizontal plane of said spaced horizontal support members 15 and 16. The secondary pair of drive wheels 24 and 25 are aligned vertical with and engage the inner drive wheels 22 and 23 so as to transfer directional rotational input to said main support wheels 19 and 20 which are rotationally secured to said inner-drive wheels 22 and 23.

A pivoted back body support 27 has a generally elongated rectangular configuration comprised of a pair of spaced support members 28 with a upper and lower transverse connection members 29 and 30 and downwardly extending space feet support arms 31 and 32. A foot support plate 33 extends at a 90 degree right angle from said arms 31 and 32 and has a pair of feet positioning guides 34 thereon.

A cushion and support 35 is secured to one side of said back support 27 and extends upwardly beyond the upper transverse connection member 29 with an area of reduced transverse dimension at 36. A pair of side body support pads 37 are secured respectively from each of said support members 28 via offset brackets 38 so as to position each of the support pads 37 on said cushion and support 35 inwardly from its respective perimeter edges.

Figure 5:
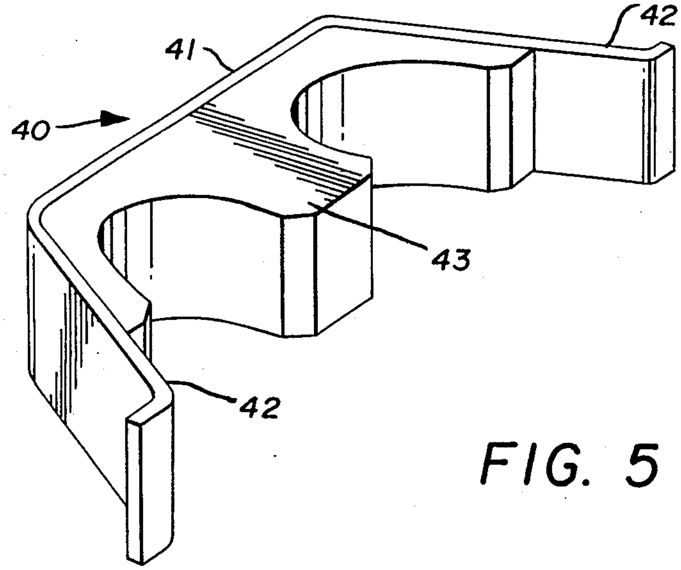
FIG. 5 is a perspective view of a contoured leg restraint bracket for use on the upright wheelchair.

A pair of oppositely disposed handles 39 extend from the support members 28 adjacent the offset brackets 38 on the side opposite said cushion and support 35 best seen in FIGS. 1 and 2 of the drawings. A leg brace 40 seen in FIG. 5 of the drawings is comprised of an outer support band 41 having mounting arms 42 with a contoured insert 43 defining two side by side U-shaped configuration. The leg brace 40 is secured to the support members 28 at its arm termination on the same side and just below said cushion and support 35.

A back support leg 44 is pivotally secured to said upper transverse connection member 29 and to a angle brace arm 45 that extends from a mounting bracket 46 on the back of the cushion support 35. A leg retainer clip 47 removably secures the free end of said back support leg to the cushion and support 35. A rubber or plastic foot 48 is positioned on the end of the back support leg 44 for slip free engagement with the ground G upon leg deployment as seen in broken lines in FIG. 1 of the drawings. The back body support 27 is pivoted to a horizontal position between the upstanding side frame configurations 12 at pivot points on either side of the support member 28 at the horizontal support member 16 at 49. A retaining clamp 50 having a rectangular strap configuration with a down-turned end curved end portion 51 is secured to the lower transverse connection member 31 midway thereon and extends outwardly therefrom for frictional engagement on its curved end portion 51 with said transversely extending side frame connector member 18 as will be well understood by those skilled in the art when the back body support 27 is in vertical position during use.

The front of the rectangular base 11 is supported by a pair of vertically offset oppositely disposed castor wheels 52 each secured adjacent the front end of the base 11 for multi-directional support thereof in a similar manner as a standard wheel chair.

A brake assembly 53 is positioned on the rectangular base 11 between the castor wheels 53 and the main support wheels 19 and 20. The brake assembly 53 is comprised of a tubular spaced member 54 and a series of pivoted inner-dependent offset arms 55 which engage a brake bar 56 into the respective main support wheels 19 and 20 by movement of a handle lever 57 as will be well understood by those skilled in the art.

A body support stop 58 is secured on the rectangular base 11 just inwardly of the inner-section of the base 11 and the vertical support members 14 and is comprised of a L-shaped bracket aligned to engage the support member 28 when in a vertical position preventing movement past the body support stop 58.

In operation the user is positioned on the back body support cushion 27 with the user's feet within the feet guide 34 when the back body support cushion 27 is in the horizontal position being supported by the back support leg 44 as seen in FIG. 1 of the drawings in broken lines. Body retention straps S are secured around the user, the leg brace 40 is locked into position on brackets 40B and the back body support 27 is inverted to vertical use position. The retaining clamp 50 is secured as here and before described. The user now locked in a vertical standing position can engage the secondary pair of drive wheels 24 and 25 and propel themselves and the upright wheel chair forward by pulling i.e. turning the wheels 24 and 25 towards themselves.

It will be apparent from the above description that the use of such a chair configuration with the user in a more natural standing position greatly increases the scope of independence which is valuable from both a physical as well as a mental viewpoint.

Thus will be seen that a new and useful upright wheel chair has been illustrated and described and it will be apparent to those skilled in the art that various changes and modifications may be made therein without departing from the spirit of the invention, therefore

I claim:

1. An upright wheelchair having a main support frame, with upstanding side frame configurations, main support wheels and multiple directional wheels on said main support frame, a back body support pivotally secured between said upstanding side frame configurations, inner-drive wheels secured in spaced relation to said main support wheels, secondary drive wheels vertically aligned with said inner-drive wheels and rotatably engaging same in reverse direction and said main support wheels, means on said back body support for locking same in vertical position, means on said back body support for supporting same in horizontal position, means for supporting a chair user in upright position on said back body support, secondary means for securing the user on said back body support, means for locking said main support wheels, inner-drive wheels and said secondary drive wheels.

2. The upright wheel chair of claim 1 wherein said means on said back body support for locking same in vertical position comprises a body support lock and a retaining clamp extending from said back body support and engageable on said main support frame.

3. The upright wheel chair of claim 1 wherein said means for supporting said back body support in horizontal position comprises a back support leg deployable from said back body support and engageable with the ground.

4. The upright wheel chair of claim 1 wherein said means for supporting a chair user in an upright position on said back body support comprises side body supports and multiple straps.

5. The upright wheel chair of claim 1 wherein said means for locking said main support wheels comprises a brake assembly on said main support frame engageable on the main support wheels.

* * * * *